United States Patent [19]
Denton

[11] Patent Number: 5,653,207
[45] Date of Patent: Aug. 5, 1997

[54] DIESEL ENGINE EMERGENCY SHUTOFF DEVICE

[75] Inventor: Daniel Webster Denton, Boling, Tex.

[73] Assignee: James Clifford Sterling, Boling, Tex.

[21] Appl. No.: 594,528

[22] Filed: Jan. 31, 1996

[51] Int. Cl.$^6$ ..................................................... F02B 77/00
[52] U.S. Cl. ........................................................ 123/198 D
[58] Field of Search ........................... 123/198 D, 184.21

[56] References Cited

U.S. PATENT DOCUMENTS

| | | | |
|---|---|---|---|
| 3,620,324 | 11/1971 | Smidey | 123/198 DC |
| 3,626,919 | 12/1971 | MacMillan | 123/198 DC |
| 3,741,332 | 6/1973 | Sakakibara et al. | 123/198 D |
| 3,927,656 | 12/1975 | Reed et al. | 123/198 D |
| 4,215,845 | 8/1980 | Sturgeon | 251/63 |
| 4,285,494 | 8/1981 | Sturgeon | 251/63 |
| 4,422,418 | 12/1983 | Dorn | 123/198 D |
| 4,537,386 | 8/1985 | Krepela et al. | 251/302 |
| 5,003,943 | 4/1991 | Lafferty, Sr. | 123/198 D |
| 5,205,252 | 4/1993 | Krepela | 123/198 D |

FOREIGN PATENT DOCUMENTS

| | | | |
|---|---|---|---|
| 3504249 | 8/1985 | Germany | 123/198 D |
| 311031 | 8/1971 | U.S.S.R. | 123/198 D |

*Primary Examiner*—David A. Okonsky
*Attorney, Agent, or Firm*—Michael B. Jolly

[57] ABSTRACT

A diesel engine emergency shutoff device for use on a regularly aspirated or turbocharged diesel engine. The device is mounted between on the engine's air intake tube and utilizes a closure valve biased to the open position by biasing means and actuated to the closed position by engine vacuum.

12 Claims, 5 Drawing Sheets

1

DIESEL ENGINE EMERGENCY SHUTOFF DEVICE

BACKGROUND OF THE INVENTION

It is well known that diesel engines pose particular problems when operating in an atmosphere or environment containing natural gas or other volatile hydrocarbons. This often occurs in oil fields or chemical plants where engines, operating in and around a volatile fuel source, draw feral gas into the engine's intake manifold resulting in uncontrollable engine revving and possible catastrophic engine failure.

Numerous devices have been developed which interrupt either diesel fuel flow or air induction into the engine's air intake. Most of these devices require an external power source to either actuate an electric solenoid or to supply hydraulic pressure or are actuated manually with a cable. The present invention provides a diesel air intake shutoff device which operates fully automatically, uses no electrical wiring, no hydraulic plumbing and furthermore is easily retrofitted to an existing diesel engine.

The invention utilizes a valve assemble to shutoff the intake air between the engine's air filter and air horn or turbocharger. The valve is actuated by a trip mechanism controlled by engine vacuum on a regularly aspirated engine and controlled by a combination of engine vacuum and turbocharger pressure on a turbocharged engine.

SUMMARY OF THE INVENTION

It is accordingly an object of the present invention to provide a diesel engine emergency shutoff device which is fully automatic, requires no electrical wiring, no hydraulic plumbing, and is easily installed on any existing diesel engine.

It is a further object of the invention to provide a diesel engine emergency shutoff device which operates on either a regularly aspirated diesel engine or a turbocharged diesel engine to prevent engine over-revving and possible catastrophic engine failure when vaporized hydrocarbons are drawn into the engines air intake.

It is another object of the present invention to provide an emergency engine shutoff device which operates on either regularly aspirated diesel engines or turbocharged diesel engines and further is equipped with an air intake passageway valve with a valve closure gate pivotally mounted substantially perpendicular to the air intake passageway so that rotation of the closure gate about it's mounting axis relates to an open position when the closure gate is out of the path of intake air and a closed position when the closure gate is in the path of the intake air. A means providing for normally locking the closure gate in the open position and further said locking means being biased in the locking position by an adjustable locking tension means and a means for releasing the locking means said releasing means being operated by engine vacuum.

DETAILED DESCRIPTION OF THE DRAWINGS

Figure 3:
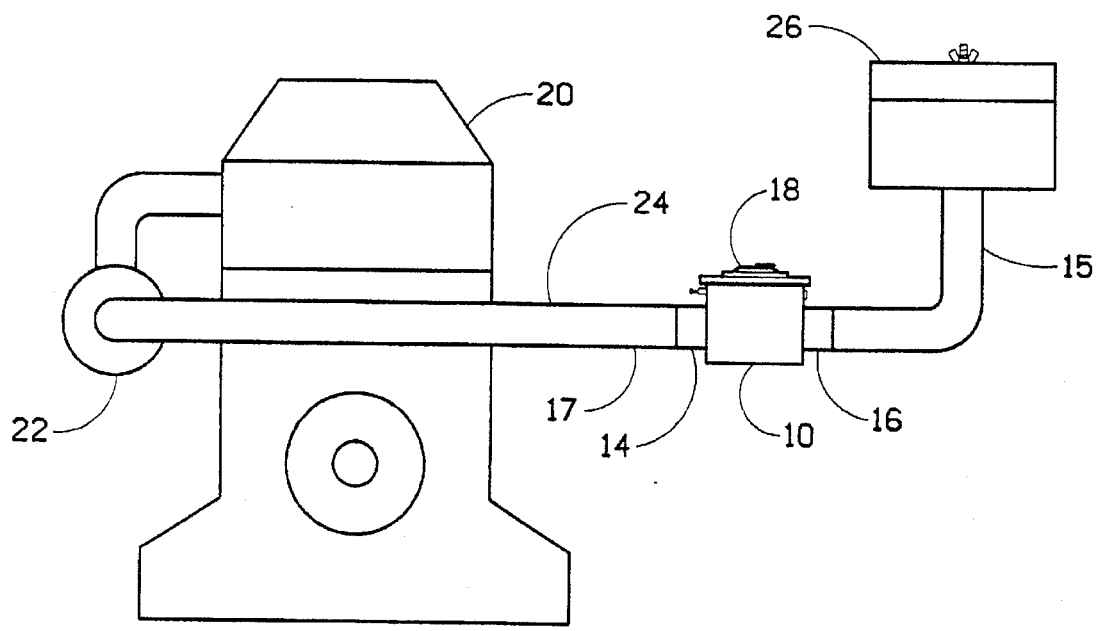
FIG. 3 is a front view of a diesel engine with the emergency shutoff device installed.
Figure 4:
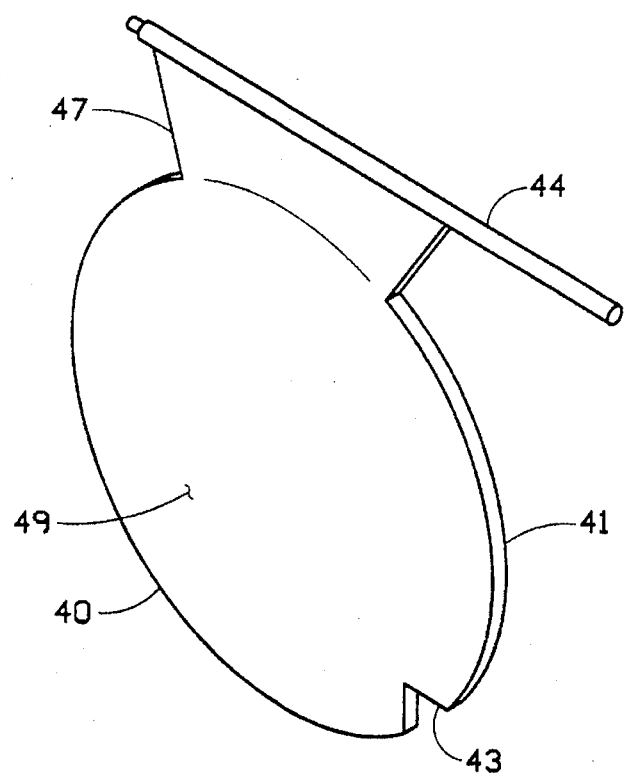
FIG. 4 is a back view of the closure plate removed from the diesel engine emergency shutoff device.

Referring to the drawings the diesel engine emergency shutoff device according to the invention is illustrated as installed generally at 10 in FIG. 3. The device as shown is installed on a diesel engine 20 equipped with a turbocharger 22. The device is installed within the air intake tube 24 between the engine's air cleaner 26 and turbocharger 22 when the device is installed on a normally aspirated diesel engine it is installed between the engine's air filter and intake manifold. The device axis 12 as illustrated in FIG. 1 is generally parallel to the engine's air intake tube 24 and is installed with front 14 towards the engine's turbocharger or intake manifold, rear 16 towards the engine's air filter and top 18 substantially horizontal.

Figure 1:
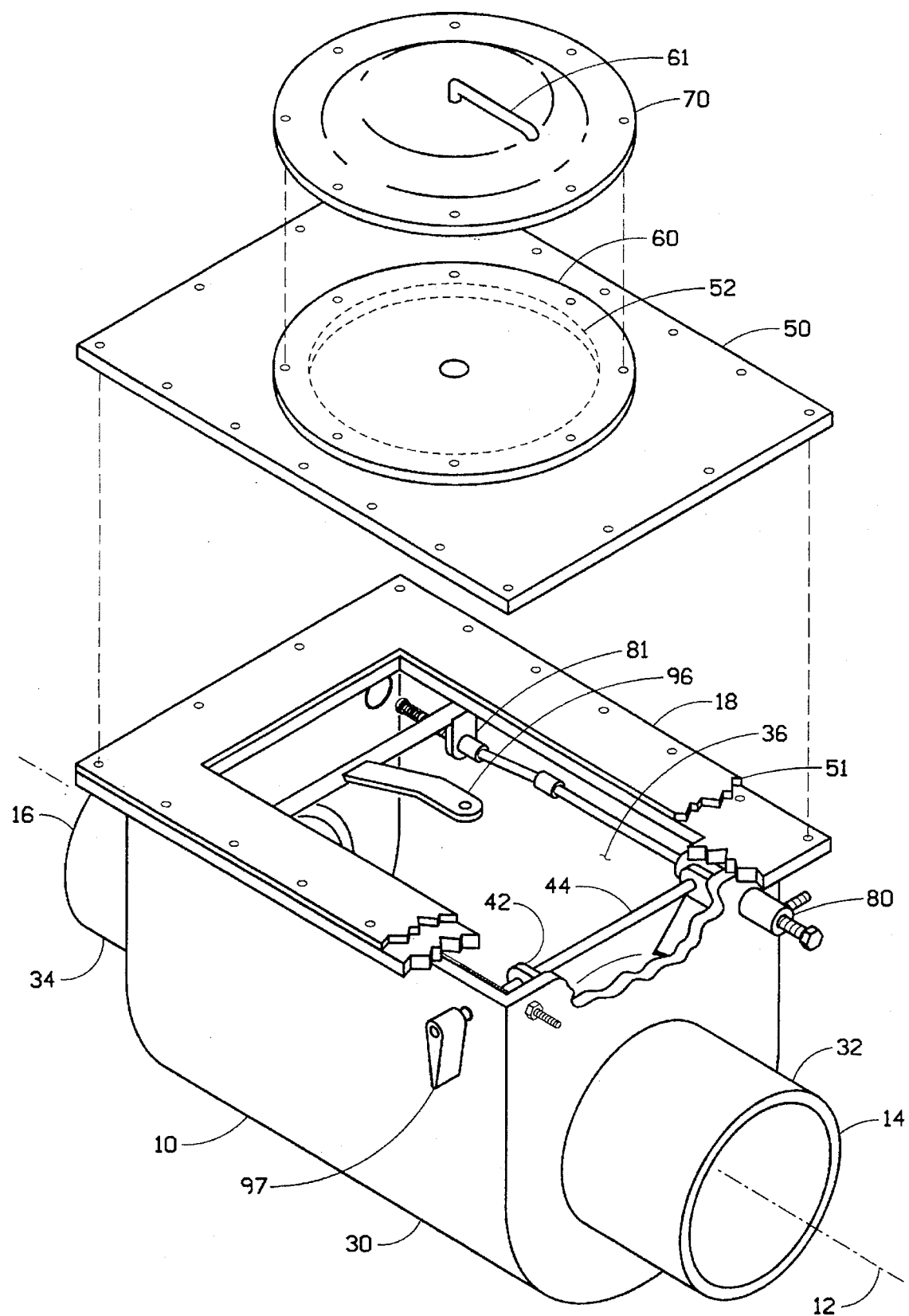
FIG. 1 is a perspective, partially exploded and front view of the diesel engine emergency shutoff device.
Figure 2:
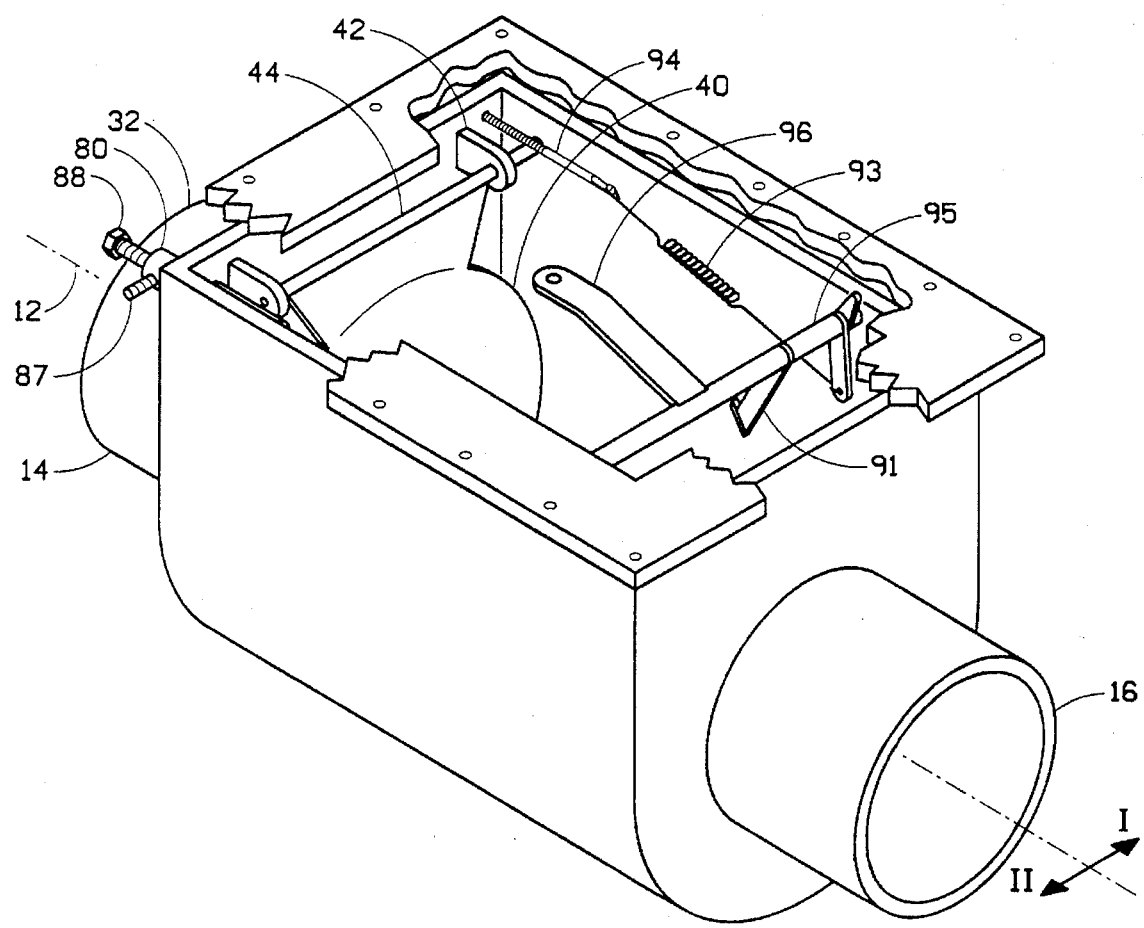
FIG. 2 is a cut away perspective view of the back of the diesel engine emergency shutoff device.

FIG. 1 illustrates the device in an exploded view with the valve body 30 constructed not only dimensioned to contain a valve closure plate 40 but also to form a valve body cavity 36 which contains the device's activation mechanism. Inspection lid 50 is sealingly attached to the valve body top 18 utilizing a gasket 51 forming an airtight valve body cavity 36. The lid 50 has an aperture 52 whereupon rubber diaphragm 60 is installed and further which diaphragm 60 is covered by diaphragm cover 70. Diaphragm cover 70 is also vented by vent tube 61. Valve body 30 has outlet tube 32 on the front 14 and inlet tube 34 on the rear 16. Inlet tube 34 connects the device to the engine's air filter tube 15 while outlet tube 32 connects to the engine's turbocharger tube 17 or intake manifold on a normally aspirated engine.

Figure 5:
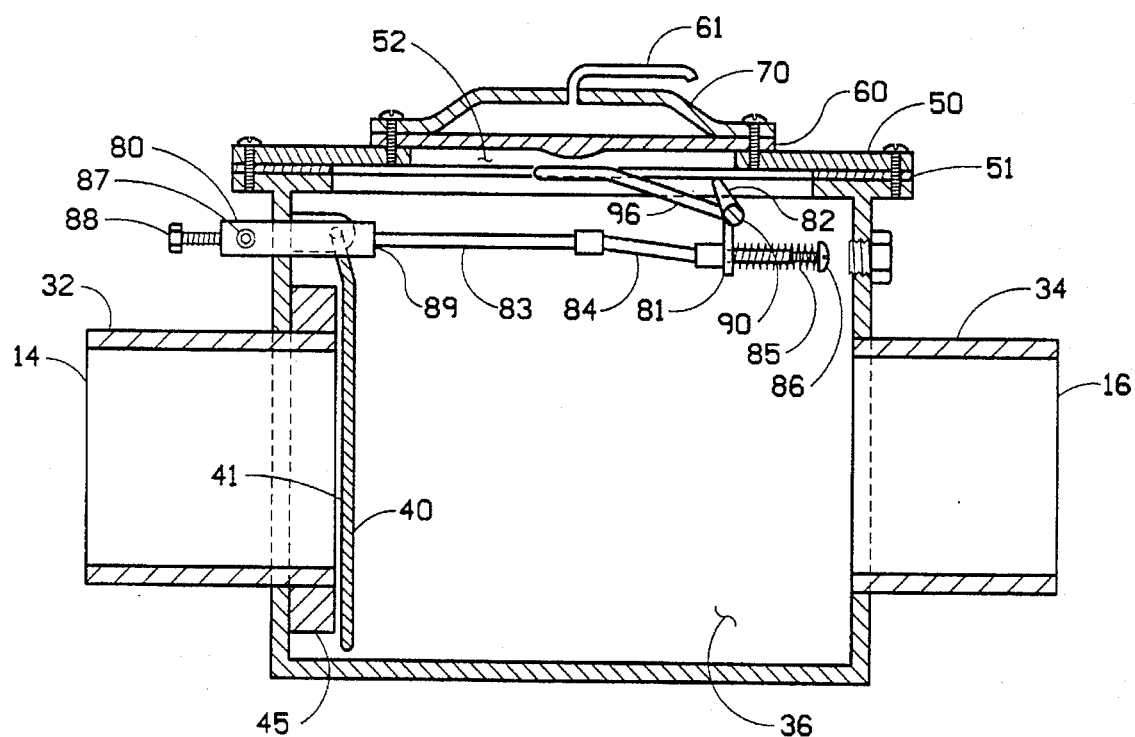
FIG. 5 is a partial cross section of the emergency shutoff device illustrating the closure plate mounted and in the closed position taken along the line I of FIG. 3.
Figure 6:
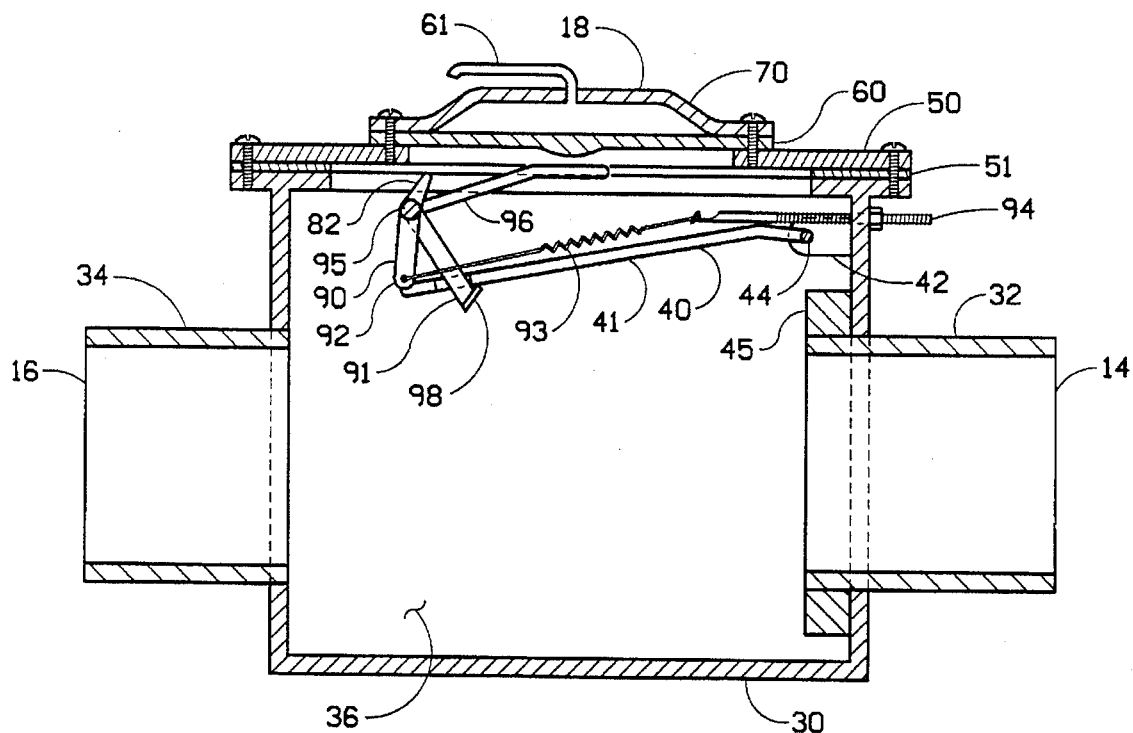
FIG. 6 is a partial cross section of the emergency shutoff device illustrating the closure plate in the open position taken along line II of FIG. 3.
Figure 7:
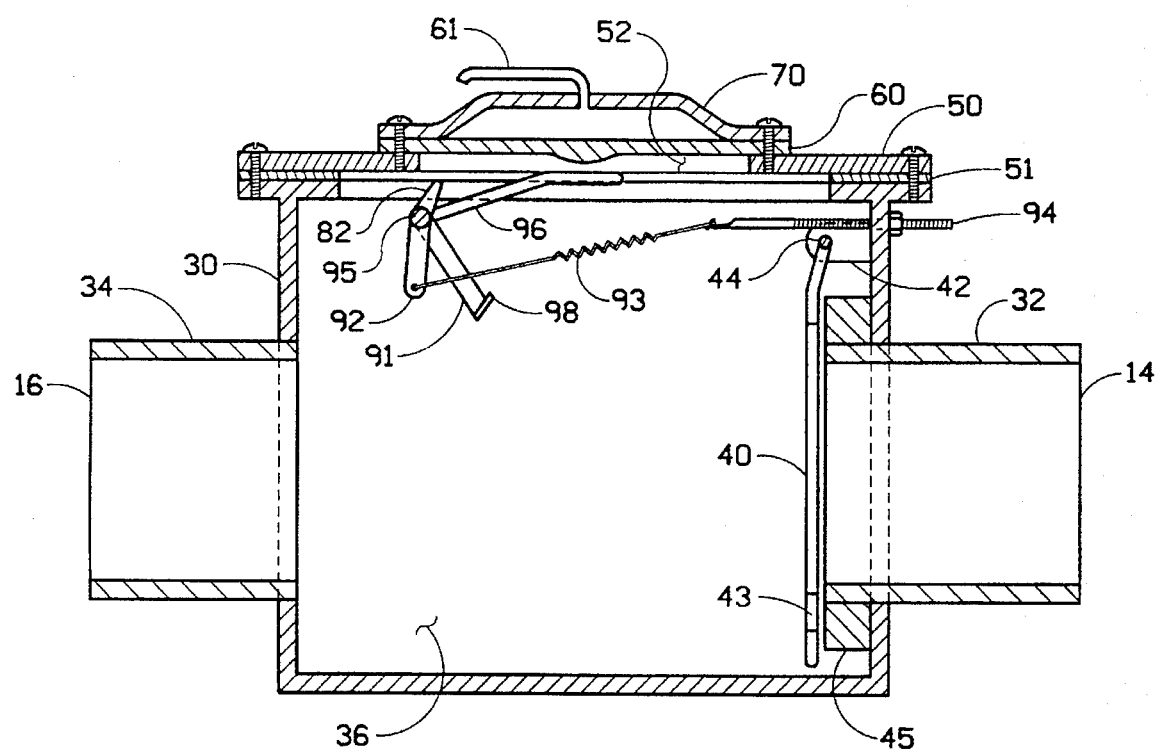
FIG. 7 is a partial cross section of the emergency shutoff device illustrating the closure plate in the closed position taken along line II of FIG. 3.

In combination the figures illustrate in more detail valve closure plate 40, air cylinder 80 and closure plate tripping mechanism 90. Closure plate mounting supports 42 are fixidely attached inside valve body cavity 36 near the top 18 and front 14. Closure plate 40 has mounting shaft 44 fixidely attached to the top edge 39 of closure plate 40 and further the mounting shaft 44 is installed upon mounting supports 42 with one end of the mounting shaft 44 exiting the valve body 30. Manual operation lever 97 is installed upon the portion of shaft 44 which exits valve body 30 for manually rotating the shaft. Closure plate 40 is constructed of plate metal and dimensioned with a circular area 49 which is slightly larger than the outer diameter of closure plate sealing ring 45, and mounting member 47 which connects closure plate circular area 49 with closure plate mounting shaft 44. The closure plate also has sealing surface 41 which contacts sealing ring 45 when the device is in the closed position. The sealing ring 45 is most preferable constructed of diesel fuel resistant resilient material. The closure plate 40 is mounted for rotational movement along an axis perpendicular to axis 12 so that rotation of the closure plate along it's mounting shaft 44 results in arcing closure plate movement parallel to axis 12. The location of the closure plate rotation mounting means as described above results in rotational closure plate movement of approximately 90 degrees. Closure plate 40 also has latching notch 43 which serves as a location for latching arm 91 to lock closure plate 40 in it's open position as illustrated in FIG. 6. The tripping mechanism 90, air cylinder 80 and diaphragm 60 work together as the closure plate activation mechanism which includes shaft 95, biasing arm 92, biasing spring 93, adjustable biasing means 94, diaphragm arm 96, air cylinder arm 81, shaft rotational stop 82, air cylinder rod 83, cylinder flexible connection 84, cylinder tension spring 85, cylinder tension spring adjustment means 86, diaphragm 60, diaphragm cover plate 70 and diaphragm vent 61. The tripping mechanism shaft 95 is mounted within valve cavity 36 near top 18 and rear 16 perpendicular to axis 12 and further mounted for rotation movement around the axis of the shaft 95. Biasing arm 92 is fixidely attached to shaft 95 and serves as a connection point for biasing spring 93. When viewing the device, as in FIG. 6 with the front 14 to the right and the rear 16 to the left, the biasing arm 92 and biasing spring 93 are mounted to urge shaft 95 rotation in a counter clockwise direction. The latching arm 91 is also fixidely attached to shaft 95 and has a latching cog 98 formed at the end to latch the closure plate 40 on the closure latching notch 43 when the plate 40 is rotated to contact and then slightly beyond the latching arm 91. Shaft 95 rotation is limited by a shaft rotation stop 82 which is located to prohibit counter clockwise shaft rotation beyond a set position. The shaft 95 is held in the set position by biasing spring 93 and further the set position positions the latching arm 91 so that it will latch the closure plate 40 upon it's rotation. Biasing spring 93 is attached to an adjustable biasing means 94 which is composed of a shaft threaded at one end and hooked at the other end to attached the biasing spring 93. Diaphragm arm 96 is also attached to shaft 95 approximately 90 degrees in relation to latching arm 91 and when the shaft 95 is in it's set position the diaphragm arm 96 extends to the center of the diaphragm 60 and further positioned to lightly contact the center of diaphragm 60. Air cylinder arm 81 is also fixidely attached to shaft 95 providing a connection point for air cylinder 80. Air cylinder 80 having a moveable piston 89 is mounted through the valve body 30 near the top 18 and front 14. Turbocharger pressure operates the cylinder by connection of a hose at hose nipple 87. Air cylinder rod 83 is connected to piston 89 and extends from the air cylinder 80 and is flexibly attached to air cylinder arm 81. Air cylinder flexible connection 84 is used to facilitate the flexible attachment of the air cylinder rod 83 to the air cylinder arm 81. As will be described in the method of operation as turbocharger pressure increases the air cylinder rod piston 89 and cylinder rod 83 is pulled into the cylinder resulting in clockwise shaft 95 rotation, when viewing shaft 95 as in FIG. 5. Cylinder rod tension spring 85 and cylinder spring tension adjustment means 86 provides selective tension on the air cylinder arm 81 biasing the cylinder arm 81 and shaft 95 to rotational movement in the counter clockwise direction as viewed from FIG. 6 and further resulting in movement of the diaphragm arm 96 in a direction towards the diaphragm 60 which movement is limited by shaft rotational stop 82.

In operation the shutdown device 10 is positioned so that engine intake air enters the rear 16 and exits the front 14, if the engine is turbocharged air cylinder hose nipple 87 is routed to the engine's turbocharger high pressure outlet while the air cylinder is left disconnected if the device is installed on a normally aspirated engine, the diaphragm vent tube 61 is open to the atmosphere. The device is manually placed in the open position by rotation of the manual operation lever 97 which swings the closure gate 40 out of the air flow path and latching the closure plate 40 upon latching arm 91.

If the device is installed on a normally aspirated engine closure plate 40 is held in the open position as illustrated in FIG. 6 by latching arm 91 and biased to the remain in the open position by biasing spring 93. While the engine is operating and as engine speed increases vacuum increases in valve body cavity 36 thereby resulting in diaphragm 60 movement towards diaphragm arm 96 and increased diaphragm 60 pressure upon diaphragm arm 96. As diaphragm 60 pressure overcomes the biasing force of biasing spring 93 the shaft 95 will rotate clockwise, as viewed in FIG. 6, thus moving latching arm 91 so that closure plate swings freely into the airflow path. Since airflow is from left to right, as viewed in FIG. 6, the airflow will cause closure plate 40 to be drawn to the closed position contacting sealing surface 45 and thus shutting down engine operation. Biasing spring 93 tension will determine when the device will be tripped from the open to the closed position. Spring tension adjustment means 94 is adjusted so that the mechanism is tripped at a set engine RPM. Since increased engine RPMs increases engine vacuum the device can be adjusted so that it is tripped at an RPM which corresponds to a vacuum pressure which overcomes biasing tension spring 93.

If the device is installed on an engine which is turbocharged closure plate 40 is latched into an open position and biased to remain in the open position as discussed above, however under load conditions as turbocharger pressure increases air cylinder 80 incrementally withdraws air cylinder rod 83 thereby incrementally increasing the biasing force which maintains the closure plate 40 in the open position. The air cylinder rod 83 stroke length is adjusted utilizing air cylinder piston stop 88 and further the biasing force is incrementally adjustable utilizing air cylinder spring adjustment means 86. While the engine is operating under load conditions RPM and turbocharger pressure increases resulting is air cylinder 80 actuation leading to clockwise shaft 95 rotation, when viewing the shaft as in FIG. 5, and diaphragm arm 96 movement towards diaphragm 60. As engine RPM and load increases air cylinder 80 increases it's biasing effects the closure plate 40 to remain in the open position. The air cylinder rod adjustment means 86 is adjusted so that air cylinder activation will cease to increase pressure upon cylinder arm 81 at a given engine speed. If the engine speed increases above the adjusted preset limit then increased turbocharger pressure will not result in increased force upon the cylinder arm 81. As engine RPMs increase beyond the set point engine vacuum urges movement of diaphragm 60 towards diaphragm arm 96 which in turn overcomes the biasing effects of air cylinder 80 resulting in movement of latching arm 91 and release of cover plate 40 from the open position to the closed position.

I claim:

1. An emergency diesel engine shutdown device wherein said diesel engine is equipped with an air intake tube, comprising:

a) a valve member;

b) means mounting said valve member for movement parallel to flow of air through said air intake tube between an open position outside the path of air flow therethrough, and a closed position blocking the flow of air therethrough;

c) locking means retaining the valve member in a normally open position, the locking means further having an adjustable biasing means which urges the valve member to the open position, d) locking release means actuated by engine vacuum.

2. Apparatus as set forth in claim 1 wherein said valve member is defined by a valve body having two ends a top and a bottom said valve body forming a valve body cavity substantially sealed so that engine intake air does not leak from the apparatus, with an air intake tube entering one valve body end and another air outlet tube exiting the other valve body end, a closure plate of a size and configuration corresponding to the cross sectional configuration of the air outlet tube and provided with sealing means to effect a seal between the closure plate and outlet tube both in the open and closed positions.

3. Apparatus as set forth in claim 2 wherein said mounting means is defined by a pivot arm attached inside the valve body cavity near the outlet tube and mounted for pivotal movement on a pivot pin about an axis perpendicular to the flow of air through the air intake tube.

4. Apparatus as set forth in claim 3 wherein said locking means includes a shaft mounted inside the valve body cavity near the inlet tube and further mounted for rotational movement along an axis perpendicular to the flow of air through the air intake tube, closure plate retaining means attached to the shaft which holds the closure plate in the open position while the engine is in normal operating conditions, biasing means for urging the closure plate to remain in the open position while the engine is operating under normal conditions.

5. Apparatus as set forth in claim 4 wherein said biasing means for urging the closure plate to remain in the open position includes a biasing arm fixidely attached to said shaft, a spring attached to the arm and a means for selectively adjusting the tension of the spring.

6. Apparatus as set forth in claim 5 wherein said means for selectively adjusting the tension of the spring include a shaft threaded on one end and a hook at the other end for attaching the spring while the threaded end extends through an appature in the valve body and is fitted with nut which when screwed on the shaft either tightens or loosens spring tension.

7. Apparatus as set forth in claim 6 wherein said closure plate locking means includes a latching notch located on the perimeter of the closesure plate, a locking arm with two ends with one end being fixedly attached to said shaft and the other end having a latching cog which catches on the notch when the plate is pivoted to contact the latching cog.

8. Apparatus as set forth in claim 7 wherein said locking release means includes a valve body top plate sealingly mounted to the top of the valve body said plate having a centrally located aperture, a diaphragm mounted about said top plate aperture, a diaphragm arm fixidely attached to said mechanism shaft said diaphragm arm extending to the center of the diaphragm and positioned so that the diaphragm center rests on the diaphragm arm, further positioned so that engine vacuum causes diaphragm pressure upon the diaphragm arm and further mechanism shaft rotation when the diaphragm pressure overcomes the biasing means tension which then releases the closure plate locking means from the open position causing the closure plate to swing freely to the closed position.

9. Apparatus as set forth in claim 8 wherein said diesel engine is equipped with a turbocharger said biasing means further includes an air cylinder, an air cylinder piston positioned within said air cylinder being actuated by air pressure supplied by said turbocharger, an air cylinder rod extending from said air cylinder piston further said rod being withdrawn towards the air cylinder as turbocharger pressure increases, an air cylinder arm fixidely attached to said mechanism shaft, an air cylinder flexible connection between said rod and said air cylinder arm so that as the air cylinder is actuated the air cylinder arm urges rotation of the mechanism shaft in the direction of maintaining the closure plate in the open position, and a means for selectively adjusting air cylinder biasing force which urges said closure plate to remain in the open position.

10. Apparatus as set forth in claim 9 wherein said means for selectively adjusting said air cylinder biasing force includes a spring, an air cylinder flexible connection extension threaded rod inserted through said spring, a nut threaded upon said threaded rod which when screwed upon said rod increases the spring tension upon said air cylinder arm and furthermore increases biasing effects to maintain the closure plate in the open position and also increasing the diaphragm pressure necessary to release the closure plate.

11. Apparatus as set forth in claim 9 wherein said engine vacuum causes diaphragm pressure upon the diaphragm arm and further mechanism shaft rotation when the diaphragm pressure overcomes the biasing means tension and the air cylinder biasing tension which then releases the closure plate locking means from the open position causing the closure plate to swing freely to the closed position.

12. Apparatus as set forth in claim 6 wherein said locking release means includes a diaphragm constructed of resilient diesel fuel resistant material actuated by engine vacuum and further positioned so that engine vacuum causes diaphragm movement in a direction which urges shaft rotation against biasing effects of the air cylinder and biasing spring.

* * * * *